(12) United States Patent
Htun et al.

(10) Patent No.: US 10,402,396 B2
(45) Date of Patent: Sep. 3, 2019

(54) ONLINE FRAUD DETECTION SYSTEM IN AN ELECTRONIC CONTENT EXCHANGE

(71) Applicant: Microsoft Technology Licensing, LLC, Redmond, WA (US)

(72) Inventors: Yamin Htun, Milpitas, CA (US); David Peter Foldes, San Francisco, CA (US); Anand Mundada, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/299,231

(22) Filed: Oct. 20, 2016

(65) Prior Publication Data
US 2018/0113899 A1    Apr. 26, 2018

(51) Int. Cl.
| | | |
|---|---|---|
| *G06F 17/30* | (2006.01) | |
| *G06F 16/23* | (2019.01) | |
| *G06N 20/00* | (2019.01) | |
| *H04L 29/08* | (2006.01) | |
| *H04L 29/06* | (2006.01) | |
| *G06F 21/55* | (2013.01) | |
| *G06F 21/56* | (2013.01) | |

(52) U.S. Cl.
CPC ........ *G06F 16/2379* (2019.01); *G06F 21/552* (2013.01); *G06F 21/566* (2013.01); *G06N 20/00* (2019.01); *H04L 63/0263* (2013.01); *H04L 63/1408* (2013.01); *H04L 67/22* (2013.01)

(58) Field of Classification Search
CPC ...................................... G06F 17/30
USPC ........................................................ 707/694
See application file for complete search history.

(56) References Cited

U.S. PATENT DOCUMENTS

| | | | | |
|---|---|---|---|---|
| 7,657,626 | B1* | 2/2010 | Zwicky ................. | G06Q 30/02 705/51 |
| 7,908,645 | B2* | 3/2011 | Varghese ............. | G06Q 20/341 726/4 |
| 8,676,637 | B2* | 3/2014 | Aaron .................... | G06Q 30/02 705/14.26 |
| 2006/0271389 | A1* | 11/2006 | Goodman ............. | G06Q 30/02 705/1.1 |
| 2008/0103955 | A1* | 5/2008 | Flake .................... | G06Q 30/02 705/37 |
| 2008/0201214 | A1* | 8/2008 | Aaron .................... | G06Q 30/02 705/14.47 |

(Continued)

*Primary Examiner* — Kim T Nguyen
(74) *Attorney, Agent, or Firm* — Hickman Palermo Becker Bingham LLP (57) ABSTRACT

Techniques for identifying fraudulent entities is provided. Tracking data is received for displayed content items and is associated with one or more entities. Using the tracking data and one or more rules, a determination is made whether the one or more entities are fraudulent. A new rule is received and the one or more rules are updated, while continuing to receive tracking data and determine whether one or more entities are fraudulent. The new rule is used to determine whether one or more entities are fraudulent. Fraud data about the one or more entities is stored in a central database, and, in response to a determination that a particular entity is fraudulent, an alert is sent to a content exchange. The content exchange may suspend, based on the alert, delivery of content items associated with the particular entity.

24 Claims, 3 Drawing Sheets

(56) References Cited

U.S. PATENT DOCUMENTS

| | | | | |
|---|---|---|---|---|
| 2014/0195338 A1* | 7/2014 | Woda | ............... | G06Q 10/00 705/14.45 |
| 2014/0358671 A1* | 12/2014 | Wei | ............... | G06Q 30/0248 705/14.45 |
| 2016/0164915 A1* | 6/2016 | Cook | ............... | H04L 63/04 726/1 |

* cited by examiner

ONLINE FRAUD DETECTION SYSTEM IN AN ELECTRONIC CONTENT EXCHANGE

TECHNICAL FIELD

The present disclosure relates to electronic content delivery and, more particularly, to detecting fraud in content selection. SUGGESTED ART UNIT: 2161; SUGGESTED CLASSIFICATION: 707/776.

BACKGROUND

The Internet allows end-users operating computing devices to request content from many different content providers. In addition to providing requested content, many content providers provide additional content items that originate from third-party entities. The third-party entities may compensate content providers when the content providers deliver the additional content items to the end-users or when the end-users select the additional content items. However, some applications through which the content providers display the requested content and additional content items, may be configured (intentionally or unintentionally) to automatically select additional (third-party) content items. This selection practice is referred to herein as "selection fraud" or "click fraud." Selection fraud artificially inflates the number of alleged entity selections, which increases the amount that the third-party entities must compensate the content providers. Additionally, some users may disproportionately select additional (third-party) content items even though the entities have no interest in learning more about the third-party entities. This type of fraud may be referred to as selection and/or impression fraud, and has the same adverse (from the point of view of the third party entities) compensation effect. Selection and impression fraud has proven difficult to detect.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for detecting fraud are provided. In one technique, a determination is made for each of multiple entities based on the click through rate (CTR) of each of the multiple entities. This determination is made in real-time and is based off of available data, such as impressions and clicks. For example, based on impression and click data associated with a particular entity, a CTR may be determined. If the CTR falls outside of an accepted range, then the entity may be deemed fraudulent. Other rules may also be used to make the determination that an entity is fraudulent.

Examples described herein refer to making fraud determinations for entities. The entities may be applications (whether web or native applications), publishers of content, and/or individual users (e.g., registered members of a social network service). For example, an individual user may click on all (or a relatively high percentage of) content items that are presented to the individual user, regardless of which application or publisher presents the content items. Additionally, a publisher may provide or be associated with multiple applications. A determination of whether the publisher or the application is fraudulent may be made separately, even though the two are associated. Thus, for example, a publisher might not be considered to be fraudulent, while one of its applications is considered to be fraudulent.

System Overview

Figure 1:
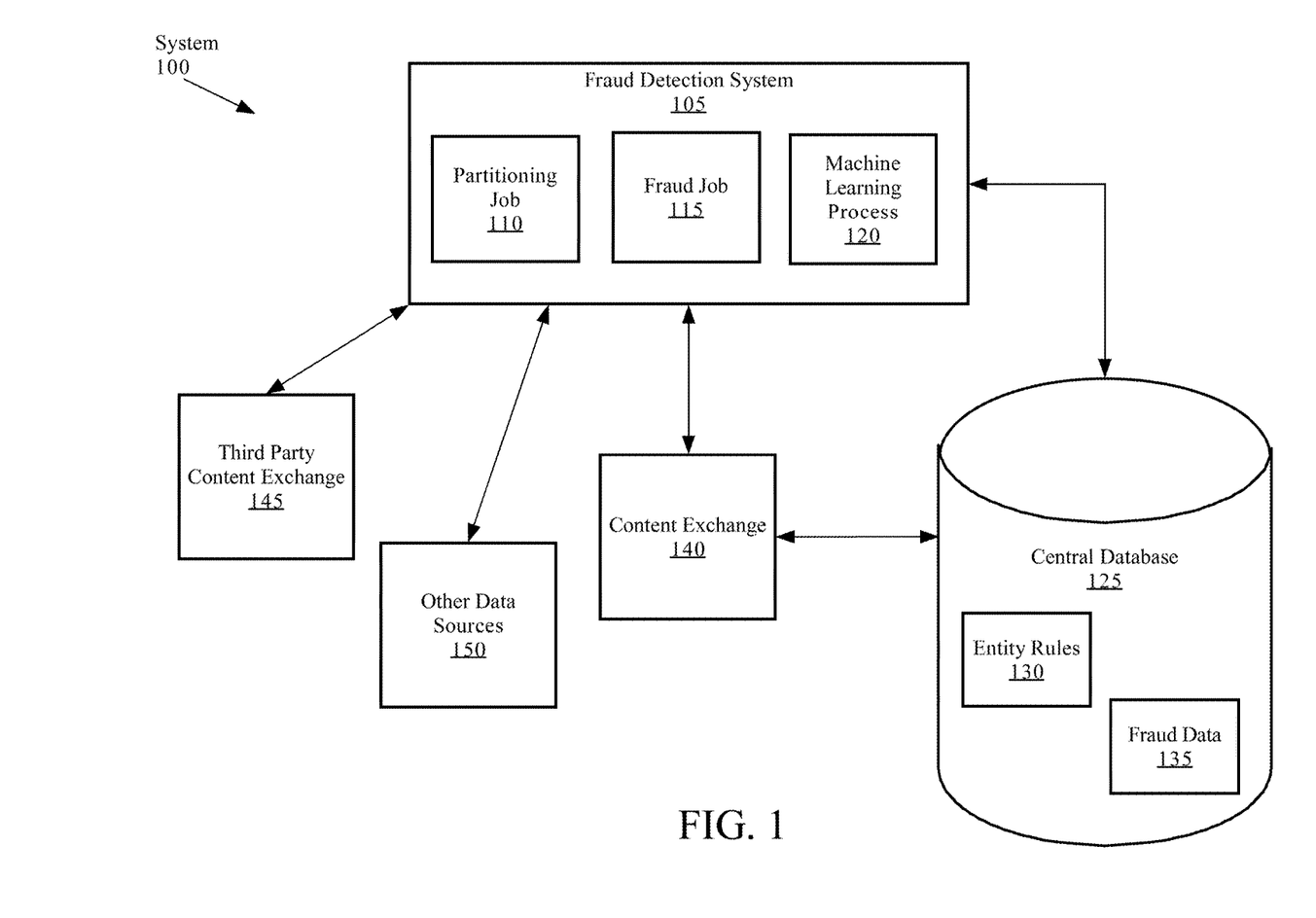
FIG. 1 is a block diagram that depicts an example system for determining fraudulent entities, in an embodiment.

FIG. 1 is a block diagram that depicts an example system 100 for determining fraudulent entities, in an embodiment. System 100 includes fraud detection system 105, partitioning job 110, fraud job 115, machine learning process 120, central database 125, entity rules 130, fraud data 135, content exchange 140, third party content exchange 145, and other data sources 150.

Content exchange 140 allows publishers (not shown) and content providers (not shown) to enable content items to be presented. Any number of publishers and content providers may interact with content exchange 140. Specifically, content providers provide content items to content exchange 140, which in turn selects content items to provide to publishers for presentation to end users or client devices. However, at the time that a content provider registers with content exchange 140, neither party may know which end users or client devices will receive content items from a content provider. Content exchange 140 may be implemented in software, hardware, or any combination of hardware and software. Content exchange 140 may be implemented on a single computing device or on multiple devices. For example, a single instance of content exchange 140 may run on a single device or multiple instances of content exchange 140 may run on multiple devices.

Content exchange 140 (or another system affiliated with content exchange 140) collects and sends tracking data to fraud detection system 105. Tracking data is discussed in more detail below. Additionally, as discussed below, some entities may be fraudulent. If an entity is determined to be fraudulent, content exchange 140 may be notified to suspend delivery of content items associated with the fraudulent entity. Content exchange 140 may suspend delivery of content items in any suitable manner, and for any amount of time.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content exchange 140.

Publishers provide their own content to end users or client devices in response to requests initiated by the end users or client devices. The requests may be sent over a network, such as a Local Area Network (LAN), Wide Area Network (WAN), Ethernet or the Internet, or one or more terrestrial, satellite or wireless links. Publishers may provide content about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software (native) application that is configured to only communicate with a single publisher (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content exchange 140. That request is sent (over a network, such as a LAN, WAN, or the Internet) by a publisher or by the client device that requested the original content from the publisher. For example, a web page that client device renders includes one or more calls (or HTTP requests) to content exchange 140 for one or more content items. In response, content exchange 140 provides (over a network, such as a LAN, WAN, or the Internet) one or more particular content items to client device directly or through a publisher. In this way, the one or more particular content items may be presented (e.g., displayed) concurrently with the content requested by client device from a publisher.

A content item may comprise an image, a video, audio, text, graphics, virtual reality, augmented reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices include desktop computers, laptop computers, tablet computers, wearable devices, video game consoles, set-top boxes, and smartphones.

Third party content exchange 145 is a content exchange operated by a third party, and may provide tracking data to the fraud detection system 105 in addition to the tracking data provided by content exchange 140. Likewise, other data sources 150 may also include tracking data to fraud detection system 105. The tracking data provided by third party content exchange 145 and/or other data sources 150 may be incomplete, inconsistent, and/or inaccurate and may require smoothing or other cleaning than the tracking data received from content exchange 140.

Bidders

In a related embodiment, system 100 also includes one or more bidders (not shown). A bidder is a party that is different than a content provider, that interacts with content exchange 140, and that bids for space (on one or more publishers) to present content items on behalf of multiple content providers. Thus, a bidder is another source of content items that content exchange 140 may select for presentation through publishers. Thus, a bidder acts as a content provider to content exchange 140 or publishers. Examples of bidders include AppNexus, DoubleClick, and LinkedIn. Because bidders act on behalf of content providers (e.g., advertisers), bidders create content delivery campaigns and, thus, specify one or more user targeting criteria, similar to a traditional content provider.

Embodiments described herein are especially useful for bidders since bidders have little data compared to context exchanges or publishers. Bidders typically only have access to statistics on impressions and selections (or "clicks") per publisher or per application. For example, bidders do not have access to data about conversions. As another example, bidders do not have access to content data of the applications, such as the identity of the application provider, the categories to which the applications belong, and content that is displayed through the applications. As another example, while a content exchange may know the number of requests from each application, bidders only know the requests that are submitted to them. Thus, bidders have access to a local view of data while a content exchange has access to a global view of the data.

Also, bidders need to make a decision in real-time whether to bid on a content request associated with a publisher. Even though fraud could be detected with more accuracy offline, the bidder has paid for the impression chance the moment the bidder bids on that chance.

Fraud Determinations

Fraud detection system 105 is any server, computer, or other computing device that processes fraud determinations. Although depicted as a single element or component, fraud detection system 105 may include multiple physical devices at one or more locations. Fraud detection system 105 may be located on the same device or devices as any of the other components. Fraud detection system 105 executes partitioning job 110, fraud job 115, and machine learning process 120, and fraud detection system 105 is communicatively connected with central database 125, content exchange 140, third party content exchange 145, and other data sources 150.

Fraud detection system 105 receives tracking data from content exchange 140, third party content exchange 145, and/or other data sources 150. The tracking data may be received in any manner and in any format. Specifically, the tracking data is a live stream of data that includes impressions and/or clicks for content items. The tracking data also includes information identifying the entities associated with the impressions and/or clicks, and may also include a request ID so that corresponding impression and click events may be correlated. The tracking data may also include other information such as metadata, device data, time, date, and/or any other available information.

Partitioning job 110 receives the stream of tracking data and partitions the tracking data by entity. Specifically, partitioning job 110 partitions the tracking data on a per-member or per-application basis. The partitioned tracking data may be stored in central database 125, memory, or any other suitable location. Tracking data, whether partitioned or not, may be stored for any suitable amount of time, and may have various smoothing functions or other data cleaning algorithms applied to the tracking data. Additionally, the partitioned tracking data may have a CTR calculated for each individual entity. The CTR may be determined at any suitable time, and may be updated as more data is received from a particular entity. For example, the CTR may be determined or updated during the process of partitioning received tracking data, or may be determined or updated by a separate process of fraud detection system 105. Optionally, a minimum number of impressions and/or clicks may be required before determining a CTR, so that the CTR is more accurate. The partitioned tracking data may subsequently be used for making fraud determinations.

Fraud job 115 uses the partitioned tracking data to make fraud determinations. Optionally, fraud job 115 may use un-partitioned tracking data to make fraud determinations. Specifically, fraud job 115 applies entity rules 130 to partitioned tracking data to determine if fraud is present. Entity rules 130 may consist of any rule, threshold, or other standard that may assist in identifying, or identifies, fraud. For example, a rule may be that a CTR below 0.5% or above 40% may indicate fraud. Extremely low CTRs may be indicative of impression fraud (fraudulently reporting that content items have been displayed, for example), while extremely high CTR may be indicative of selection fraud (where a bot or other application is reporting fake or artificial clicks, for example). As an example of another rule, entities related to tennis may be registering many fraudulent impressions and/or clicks. Accordingly, a rule may be that entities related to tennis are fraudulent.

In an embodiment, different rules consider tracking data over different time periods. For example, rule A considers tracking data from the most recent 24 hours, while rule B considers tracking data from the last 72 hours. Some rules may consider the amount of change or the rate of change across different time periods. For example, a rule may trigger a fraudulent labeling if the CTR of an entity doubles within a span of two days.

Entity rules 130 may include a duration for which the entity will be labeled fraudulent. Different rules may be associated with different durations, such as one week for rule A and two days for rule B. A fraud duration may be based partially on a number of times the entity has been deemed fraudulent before and may increase with each subsequent determination that the entity is still fraudulent. For example, entity X is determined fraudulent and the duration is one day. After that one day, entity X is again determined to be fraudulent and the duration is increased to three days. After the three days, entity X is again determined to be fraudulent and the duration is increased to two weeks.

Entity rules 130 may be separate for each different type of entity, such as members, applications, publishers, etc. For example, rule A is for members and rule B is for applications. Alternatively, some, or all, rules could be shared across all entity types. For example, rule A may be used to determine fraudulent applications and fraudulent publishers. Additionally, entity rules 130 may be updated at any time, even while the fraud detection system 105 is running. In other words, entity rules 130 may be updated with a new rule for fraud detection as tracking data is being received and fraud determinations are being made without interrupting the system. Any number of fraud jobs 115 may be executing simultaneously, such as one per entity type. Fraud job 115 applies entity rules 130 in real time and quickly produces results, since some content exchanges have very short windows for exchanging content, such as 150 milliseconds. Entity rules 130 may be stored in any suitable manner, such as a configuration file. The configuration file may be read from (e.g., by fraud job 115) and/or written to as needed without shutting down fraud detection system 105.

In an embodiment, a fraud rule that is satisfied may either trigger a fraud label (e.g., a Boolean true) or a fraud score that varies on a scale (e.g., 0 to 100 or any value 0 or above). For example, satisfying rule A results in a fraud score of 5 and satisfying rule B results in a fraud score of 3. In order to be labeled fraudulent, an entity may have a fraud score of at least 7. In this example, the entity would be labeled fraudulent. Alternatively, a non-Boolean fraud score may be used to throttle content request associated with the corresponding entity. For example, an application has a fraud score between 4 and 7, which may indicate that the party that manages fraud detection system 105 is not absolutely positive that the application is fraudulent. Accordingly, 50% of content requests that originate from the application are not replied to with any content item. Thus, the party that manages content exchange 140 may continue to respond to at least some content requests from the application in order to gather more data about the application.

Upon determination that an entity is fraudulent, fraud data 135 related to the fraudulent entity is stored in central database 125. Central database 125 may be any suitable electronic digital storage device, and may be located on one or more physical devices. Optionally, central database 125 may be located on fraud detection system 105, or any other element of system 100. The fraud data 135 may contain any information related to a fraudulent entity, such as entity type, identification or name, duration for which the entity will be deemed fraudulent, type of fraud (such as impression, selection, etc.), the rule or reason for the fraud determination, and data or links to data that caused the fraud determination. Additionally, at the time of storing the fraud data, an alert may be sent to content exchange 140 to suspend delivery of content items associated with the now-fraudulent entity.

In an embodiment, fraud detection system 105 may also execute machine learning process 120. Machine learning process 120, unlike the rest of fraud detection system 105, is not a real time, live process. Rather, machine learning process 120 runs offline and analyzes the tracking data received by the system to better identify new rules for determining when an entity is fraudulent. Any part(s) of the tracking data may be fed into the machine learning process 120 as part of the analysis. Further, as part of the analysis, the tracking data may be aggregated, anonymized, and or otherwise modified as needed. Example machine learning algorithms include supervised and unsupervised learning such as: deep Boltzmann machines, long short-term memory, artificial neural networks, regression, deep learning, ensemble methods (such as random forest, gradient boosting, xg boost), anomaly detection, and/or any other machine learning algorithm(s). The machine learning algorithms may take into account any available data, and may consider different pieces or partitions of available data at different times. For example, the machine learning algorithms may consider: prior fraud determinations, current fraud determinations, $3^{rd}$ party fraud scores, entity data such as industry category, entity status, location data, entity profile information, etc.

The advantage of using a machine learning process to identify new rules is that a machine learning process can make connections (between seemingly unrelated data) that human beings would never, or almost never, make. If machine learning process 120 identifies any new rules, then those rules may be added to entity rules 130 while the system is running, so that better fraud detection can occur without requiring a system restart or shutdown. Thus, there may be a moment where a first entity is determined to be fraudulent using one set of rules and a subsequent entity that is determined to be fraudulent was determined based on a new or updated set of one or more rules. In this example, the system may optionally reprocess the first determination using the new rule, or the system may continue to operate without reprocessing prior fraud determinations.

Process Overview

Figure 2:
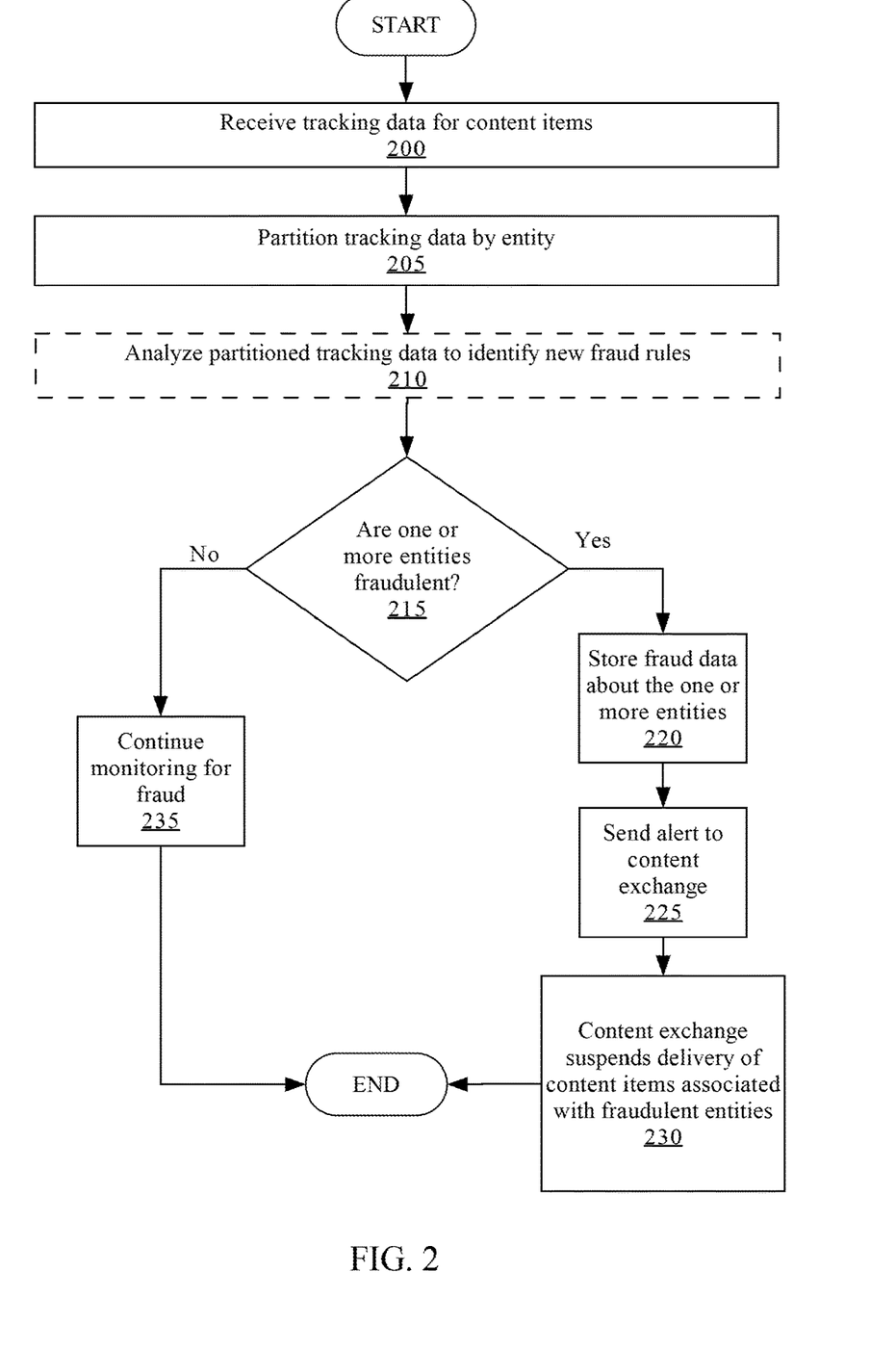
FIG. 2 is a flow diagram that depicts a process for determining fraudulent entities, in an embodiment.

FIG. 2 is a flow diagram that depicts a process for determining whether an entity is fraudulent, in an embodiment. Although FIG. 2 is depicted as occurring in a particular order, a different order, or any order, is possible, and the process should not be limited to the exact configuration described below.

In step 200, tracking data for content items is received. The tracking data may be received from a connected content exchange, a third party content exchange, or any other data source. Further, the tracking data may contain information such as identification of the entity, whether the activity was an impression and/or click, or any other related information.

In step 205, tracking data is partitioned by entity. Any number of executable jobs may be used to partition the tracking data by entity, such as one per entity type or, as another example, a set number based on volume of data received. The partitioned tracking data may be stored for a predetermined amount of time, such as two days or a week, before being deleted or moved to another system. Optionally, as part of the partitioning, calculations may be performed on the data, such as determining a CTR based on impression and click data. Alternatively, the calculations may be performed in another step, such as step 215.

In step 210, partitioned tracking data is analyzed to identify new fraud rules. Step 210 is optional, as indicated by the dotted lines, and is performed offline, unlike the other steps of FIG. 2 which may be performed in real time. The tracking data may be aggregated as part of the analysis, and identifiers for particular entities may be removed, or the data anonymized or cleaned in any other suitable fashion. Specifically, a machine learning algorithm or other neural network may be used to analyze the data. If a new rule is identified, then the new rule is added to the entity rules currently in use, or an update may be applied to an entity rule currently in use. The new rule or updated rule may be added or modified while the system is running. The new rule or updated rule may be added or changed by modifying a configuration file.

In step 215, a determination is made whether one or more entities are fraudulent. The determination is made based on partitioned tracking data and one or more entity rules. The entity rules identify standards or thresholds when entities associated with the data are likely to be fraudulent. By applying the rules to data relating to specific entities, a determination can be made whether the specific entity is fraudulent. The rules may be read from a configuration file. If there are no fraudulent entities, then the method proceeds to step 235. If there are one or more fraudulent entities, the method proceeds to step 220.

In step 220, fraud data is stored about the one or more fraudulent entities. The fraud data may be stored in a central database that both the fraud detection system and a content exchange can access. Alternatively, the fraud data may be stored at any other location. The fraud data may include any data such as an identifier or name for the entity, duration for which the entity will be deemed fraudulent, type of fraud, rule used to identify the fraud, data related to identifying the fraud, etc.

In step 225, an alert is sent to the content exchange. The alert may be sent in any format. The alert may contain any content. In one embodiment, the alert tells the content exchange to check with the central database for updated fraud data. Alternatively, the alert may include information identifying an entity that has recently been determined to be fraudulent, or any other information useful to the content exchange. An alert may be stored in local memory of the content exchange or another data source to which the content exchange has relatively fast access to ensure that the content exchange can apply the fraud data in real time, i.e., in response to a request for one or more content items that the content exchange manages and delivers.

In step 230, the content exchange suspends delivery of content items associated with fraudulent entities. The suspension may last for any amount of time determined by the fraud detection system. For example, the first time a given entity is determined to be fraudulent may result in a 2 day suspension. Then, if the same entity is determined to be fraudulent a second time (e.g., within a month of the first time or regardless of when the first time occurred), the suspension may be 4 days, and if determined to be fraudulent a third time the suspension may be 8 days. Optionally, there may be a "three strike rule," at which point the content exchange permanently suspends delivery of content items relating to the offending entity, although the number of fraud determinations before permanent suspension may be set to any amount, and need not be limited to three.

As noted previously, step 230 may involve only responding to a strict subset of content requests that are associated with a fraudulent entity, such as 25% of content requests.

In step 235, monitoring for fraud continues. Although after step 235 the method is depicted as ending, the fraud monitoring may continue by returning to step 200, or any other suitable step. In one embodiment the fraud monitoring continues anytime that the system is running.

Example Process

To ease understanding, an example will be discussed. For the purposes of this example, the following entity rules are in place: 1.) CTRs outside of 1% to 20% are fraudulent; and 2.) For members, more than 20 clicks in a day is fraud. The three entities discussed below have had their tracking data simplified for ease of explanation, and the invention should not be limited to the specifics discussed in this example.

Tracking data for a single day is received from a content exchange and is partitioned according to entity, the results are as follows:

Entity One: Type—member; impressions—100, clicks—5.

Entity Two: Type—member; impressions—50; clicks—15.

Entity Three: Type—application; impressions—10,000; clicks—150.

After being partitioned the rules are applied to the three entities, for Entity One, a CTR is calculated (5/100=5%) and compared to the first entity rule, which is satisfied because 5% is within the 1% to 20% range. Since Entity One is a member, the second entity rule is also applied, and satisfied, since 5 clicks is less than 20. Thus Entity One is not fraudulent, and no further action is taken.

For Entity Two, a CTR is calculated (15/50=30%) and compared to the first entity rule, which is not satisfied because 30% is outside the 1% to 20% range. Thus, Entity Two is fraudulent, and an alert is sent to the content exchange, and the content exchange suspends delivery of content items to Entity Two for a predetermined amount of time.

For Entity Three, a CTR is calculated (150/10000=1.5%) and compared to the first entity rule, which is satisfied because 1.5% is within the 1% to 20% range. Since Entity Three is an application, the second entity rule is not applied. Thus, Entity Three is not deemed to be fraudulent.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
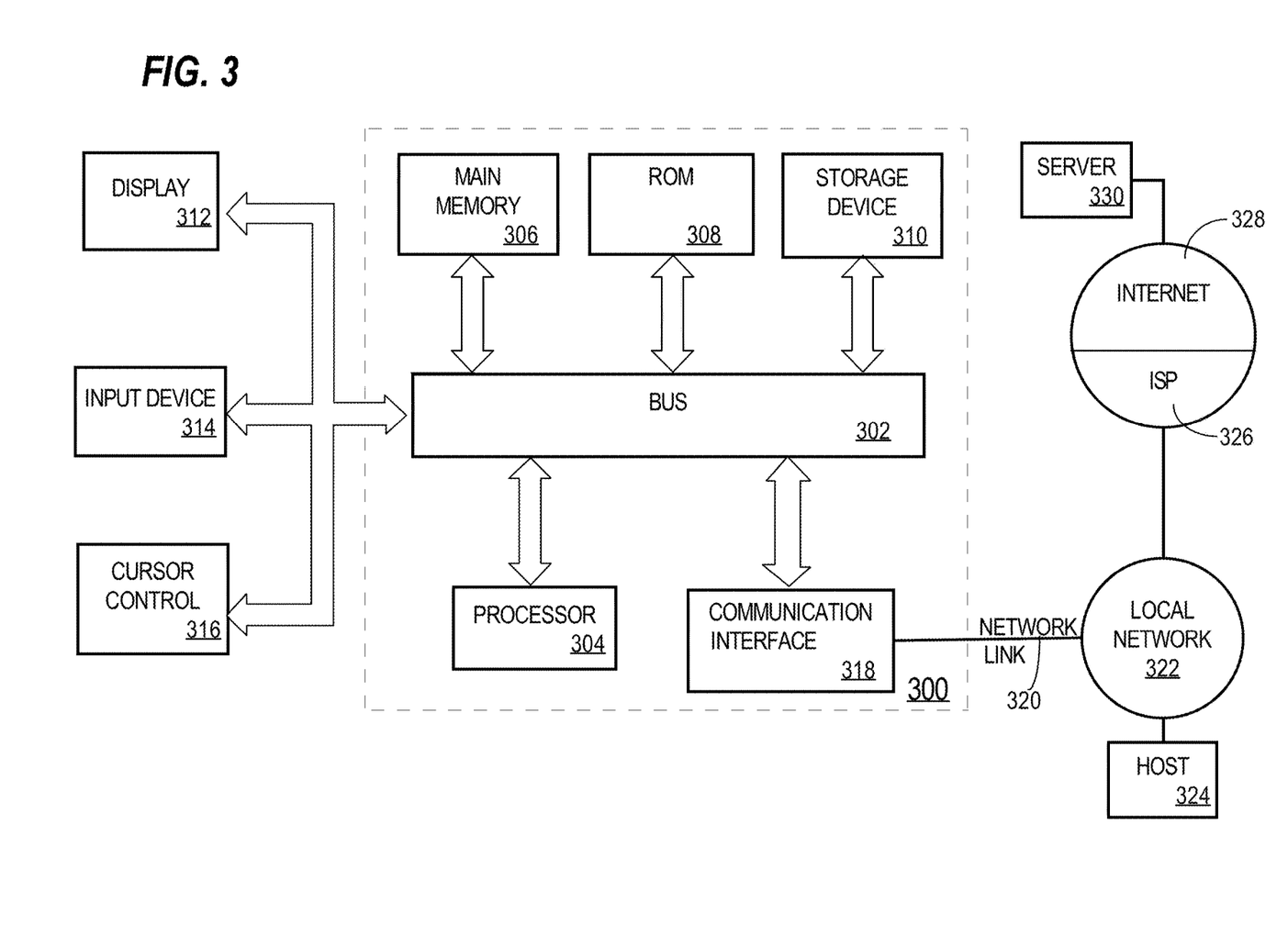
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
    a central database;
    one or more servers communicatively connected to the central database, the one or more servers comprising one or more processors and electronic digital memory storing one or more sequences of instructions which, when executed by the one or more processors, cause:
        receiving tracking data for a plurality of displayed content items, wherein the tracking data is associated with a plurality of entities;
        wherein the plurality of entities comprise a member or an application;
        partitioning the tracking data by member to create member tracking data and by application to create application tracking data;
        determining, using the tracking data and a plurality of rules, whether a first entity of the plurality of entities is fraudulent;
        wherein determining further comprises:
            determining, using the member tracking data and a plurality of member rules, whether a particular member is fraudulent;
            determining, using the application tracking data and a plurality of application rules, whether a particular application is fraudulent;
        receiving a new rule for determining fraudulent entities;
        updating the plurality of rules to include the new rule while continuing to receive additional tracking data and determining whether a second plurality of entities are fraudulent;
        after updating the plurality of rules to include the new rule, determining, using the plurality of rules, that a second entity of the second plurality of entities is fraudulent;
        storing fraud data about the first entity and the second entity in the central database;
        in response to a determination that the first entity or the second entity is fraudulent, sending an alert to a content exchange;
        suspending, by the content exchange and based on the alert, delivery of content items that are associated with the first entity or the second entity.

2. The system of claim 1, wherein the instructions, when executed by the one or more processors, further cause:
    receiving a content request associated with a particular entity, wherein the tracking data comprises data associated with the particular entity;
    wherein suspending delivery of content items prevents the content exchange from responding to content requests that are associated with the particular entity.

3. The system of claim 1, wherein the instructions, when executed by the one or more processors, further cause:
    reading the plurality of rules from a configuration file;
    writing the new rule to the configuration file.

4. The system of claim 1, wherein the instructions, when executed by the one or more processors, further cause:
    storing the tracking data;
    processing the tracking data using a machine learning algorithm to identify the new rule.

5. The system of claim 1, wherein the tracking data comprises impressions and clicks.

6. The system of claim 5, wherein the instructions, when executed by the one or more processors, further cause:
    determining, using impressions and clicks, a click through rate (CTR) for a particular entity;
    using the CTR in determining whether the particular entity is fraudulent.

7. The system of claim 6, wherein one of the member rules and one of the application rules comprise a minimum CTR and a maximum CTR.

8. The system of claim 1, wherein the determination that the first entity or the second entity is fraudulent is for a predetermined amount of time, and wherein repeated determinations that the first entity or the second entity is fraudulent increase the predetermined amount of time.

9. A method comprising:
    receiving tracking data for a plurality of displayed content items, wherein the tracking data is associated with a plurality of entities;
    wherein the plurality of entities comprise a member or an application;
    partitioning the tracking data by member to create member tracking data and by application to create application tracking data;
    determining, using the tracking data and a plurality of rules, whether a first entity of the plurality of entities is fraudulent;
    wherein determining further comprises:
        determining, using the member tracking data and a plurality of member rules, whether a particular member is fraudulent;

determining, using the application tracking data and a plurality of application rules, whether a particular application is fraudulent;

receiving a new rule for determining fraudulent entities;

updating the plurality of rules to include the new rule while continuing to receive additional tracking data and determining whether a second plurality of entities are fraudulent;

after updating the plurality of rules to include the new rule, determining, using the plurality of rules, that a second entity of the second plurality of entities is fraudulent;

storing fraud data about the first entity and the second entity in a central database;

in response to a determination that the first entity or the second entity is fraudulent, sending an alert to a content exchange;

suspending, by the content exchange and based on the alert, delivery of content items that are associated with the first entity or the second entity;

wherein the method is performed by one or more computing devices.

10. The method of claim 9, further comprising:

receiving a content request associated with a particular entity, wherein the tracking data comprises data associated with the particular entity;

wherein suspending delivery of content items prevents the content exchange from responding to content requests that are associated with the particular entity.

11. The method of claim 9, further comprising:

reading the plurality of rules from a configuration file;

writing the new rule to the configuration file.

12. The method of claim 9, further comprising:

storing the tracking data;

processing the tracking data using a machine learning algorithm to identify the new rule.

13. The method of claim 9, wherein the tracking data comprises impressions and clicks.

14. The method of claim 13, further comprising:

determining, using impressions and clicks, a click through rate (CTR) for a particular entity;

using the CTR in determining whether the particular entity is fraudulent.

15. The method of claim 14, wherein one of the member rules and one of the application rules comprise a minimum CTR and a maximum CTR.

16. The method of claim 9, wherein the determination that the first entity or the second entity is fraudulent is for a predetermined amount of time, and wherein repeated determinations that the first entity or the second entity is fraudulent increase the predetermined amount of time.

17. One or more storage media storing instructions which, when executed by one or more processors, cause:

receiving tracking data for a plurality of displayed content items, wherein the tracking data is associated with a plurality of entities;

wherein the plurality of entities comprise a member or an application;

partitioning the tracking data by member to create member tracking data and by application to create application tracking data;

determining, using the tracking data and a plurality of rules, whether a first entity of the plurality of entities is fraudulent;

wherein determining further comprises:

determining, using the member tracking data and a plurality of member rules, whether a particular member is fraudulent;

determining, using the application tracking data and a plurality of application rules, whether a particular application is fraudulent;

receiving a new rule for determining fraudulent entities;

updating the plurality of rules to include the new rule while continuing to receive additional tracking data and determining whether a second plurality of entities are fraudulent;

after updating the plurality of rules to include the new rule, determining, using the plurality of rules, that a second entity of the second plurality of entities is fraudulent;

storing fraud data about the first entity and the second entity;

in response to a determination that the first entity or the second entity is fraudulent, sending an alert to a content exchange;

suspending, by the content exchange and based on the alert, delivery of content items that are associated with the first entity or the second entity.

18. The one or more storage media of claim 17, wherein the instructions, when executed by the one or more processors, further cause:

receiving a content request associated with a particular entity, wherein the tracking data comprises data associated with the particular entity;

wherein suspending delivery of content items prevents the content exchange from responding to content requests that are associated with the particular entity.

19. The one or more storage media of claim 17, wherein the instructions, when executed by the one or more processors, further cause:

reading the plurality of rules from a configuration file;

writing the new rule to the configuration file.

20. The one or more storage media of claim 17, wherein the instructions, when executed by the one or more processors, further cause:

storing the tracking data;

processing the tracking data using a machine learning algorithm to identify the new rule.

21. The one or more storage media of claim 17, wherein the tracking data comprises impressions and clicks.

22. The one or more storage media of claim 21, wherein the instructions, when executed by the one or more processors, further cause:

determining, using impressions and clicks, a click through rate (CTR) for a particular entity;

using the CTR in determining whether the particular entity is fraudulent.

23. The one or more storage media of claim 22, wherein one of the member rules and one of the application rules comprise a minimum CTR and a maximum CTR.

24. The one or more storage media of claim 17, wherein the determination that the first entity or the second entity is fraudulent is for a predetermined amount of time, and wherein repeated determinations that the first entity or the second entity is fraudulent increase the predetermined amount of time.

* * * * *